US012654632B2

(12) United States Patent (10) Patent No.: US 12,654,632 B2
Naito et al. (45) Date of Patent: Jun. 16, 2026

(54) DOOR TRIM AND METHOD FOR MANUFACTURING THE SAME

(71) Applicant: TOYOTA BOSHOKU KABUSHIKI KAISHA, Aichi-ken (JP)

(72) Inventors: Tatsuo Naito, Aichi-ken (JP); Toshiyuki Ario, Gifu-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 199 days.

(21) Appl. No.: 18/368,323

(22) Filed: Sep. 14, 2023

(65) Prior Publication Data

US 2024/0092283 A1 Mar. 21, 2024

(30) Foreign Application Priority Data

Sep. 16, 2022 (JP) ................................. 2022-147785

(51) Int. Cl.
B60R 13/02 (2006.01)
B32B 5/18 (2006.01)
(Continued)

(52) U.S. Cl.
CPC ............ *B60R 13/0243* (2013.01); *B32B 5/18* (2013.01); *B32B 7/12* (2013.01); *B32B 27/065* (2013.01); *B32B 27/08* (2013.01); *B32B 27/32* (2013.01); *B32B 37/1207* (2013.01); *C08J 5/128* (2013.01); *C09J 5/06* (2013.01); *C09J 123/30* (2013.01); *B32B 2037/1223* (2013.01); *B32B 2266/0278* (2013.01); *B32B 2305/022* (2013.01); *B32B 2307/748* (2013.01); (Continued)

(58) Field of Classification Search
None
See application file for complete search history.

(56) References Cited

U.S. PATENT DOCUMENTS 11,104,829 B2 8/2021 Yokomichi et al.
2016/0200950 A1* 7/2016 Kalfus .................. C09J 123/16
525/240

(Continued)

FOREIGN PATENT DOCUMENTS

JP 2001-38857 2/2001
JP 2020-117606 8/2020
(Continued)

OTHER PUBLICATIONS

Machine translation of WO2018-100672 (Year: 2018).*
(Continued)

*Primary Examiner* — Samir Shah
(74) *Attorney, Agent, or Firm* — GREENBLUM & BERNSTEIN, P.L.C.

(57) ABSTRACT

A door trim including a base and a skin firmly bonded via a non-reactive hot melt adhesive layer with less dependence on the material forming bonding surfaces, and a method for manufacturing the door trim are provided. This door trim includes a base and a skin bonded to a surface of the base. A bonding surface of the base to the skin includes a region made of polyolefin and/or a region made of polyurethane. A bonding surface of the skin to the base is made of polyolefin. The bonding surfaces are bonded via a non-reactive hot melt adhesive layer containing acid-modified polyolefin.

11 Claims, 6 Drawing Sheets

(51) Int. Cl.

| | |
|---|---|
| *B32B 7/12* | (2006.01) |
| *B32B 27/06* | (2006.01) |
| *B32B 27/08* | (2006.01) |
| *B32B 27/32* | (2006.01) |
| *B32B 37/12* | (2006.01) |
| *C08J 5/12* | (2006.01) |
| *C09J 5/06* | (2006.01) |
| *C09J 123/30* | (2006.01) |

(52) U.S. Cl.
CPC ....... *B32B 2323/10* (2013.01); *B32B 2375/00* (2013.01); *B32B 2605/003* (2013.01); *C08J 2323/12* (2013.01); *C08J 2375/04* (2013.01); *C08J 2423/02* (2013.01); *C08J 2423/30* (2013.01); *C09J 2423/108* (2013.01); *C09J 2475/008* (2013.01)

(56) References Cited

U.S. PATENT DOCUMENTS

| | | | |
|---|---|---|---|
| 2018/0305592 A1 | 10/2018 | Yokomichi et al. | |
| 2021/0348032 A1 | 11/2021 | Dobashi et al. | |

FOREIGN PATENT DOCUMENTS

| | | | | |
|---|---|---|---|---|
| WO | 2017/073153 | 5/2017 | | |
| WO | WO-2018100672 A1 * | 6/2018 | ............ | C09J 131/04 |

OTHER PUBLICATIONS

Japan, Notice of Reasons for Refusal received in JP Appl. No. 2022-147785, dated Dec. 2, 2025, along with an English translation thereof.

* cited by examiner

DOOR TRIM AND METHOD FOR MANUFACTURING THE SAME

CROSS REFERENCE TO RELATED APPLICATIONS

The present application claims priority under 35 USC § 119 to Japanese Patent Application No. 2022-147785 filed on Sep. 16, 2022, the disclosure of which is hereby expressly incorporated by reference in its entirety.

BACKGROUND OF THE INVENTION

(1) Field of the Invention

The present invention relates to a door trim and a method for manufacturing the door trim. In particular, the present invention relates to a door trim including a base and a skin bonded to a surface of the base, and a method for manufacturing the door trim.

(2) Description of Related Art

A door trim is an interior material for vehicles and typically includes a base and a skin bonded to a surface of the base via an adhesive. The door trim is, for example, exposed to sunlight through a window. In other words, a trim upper portion is repeatedly irradiated with heat, thereby becoming high temperature, and also irradiated with, for example, ultraviolet rays. Thus, the base and the skin need to be firmly bonded so as not to be peeled off under such an environmental condition.

To satisfy bonding requirements in such an environment, solvent-based adhesives such as chloroprene adhesives have been used. Solvent-based adhesives provide secure bondability, but due to a growing demand for a higher level of environmental considerations, switching to solvent-free adhesives using no solvent has been desired.

In this regard, a solvent-free, reactive hot melt adhesive has been considered as an alternative. The reactive hot melt adhesive has an advantage in that it provides secure bondability and has good heat resistance by polymerization or crosslinking of the base resin. However, the reactive hot melt adhesive takes time to cure. That is, when used as an adhesive, the reactive hot melt adhesive requires time for the reaction process. If the reaction time is shortened, application workability and storage stability of the reactive hot melt adhesive are deteriorated. If the application workability and the storage stability are improved, the curing has to be degraded. That is, shortening the curing time and improving the application workability and the storage stability are contradictory, and it is difficult to achieve both of them. Regarding such a problem, JP 2020-117606 A is known.

SUMMARY OF THE INVENTION

JP 2020-117606 A discloses a vehicle interior material including a polyolefin-based substrate coated with a hot melt composition including (A) an amorphous poly-α-olefin, (B) a crystalline propylene-based polymer, (C) a tackifier resin, and (D) a Fischer-Tropsch wax, and a content of the Fischer-Tropsch wax (D) is 1 to 15 parts by weight based on 100 parts by weight of the total amount of the components (A) to (D). In this technique, a solvent-free, hot melt adhesive is used. The technique has been successful in providing a hot melt adhesive that can be used for lamination of vehicle interior materials, is excellent in adhesion and heat resistance, and is hardly transferred to the surface of a substrate such as a skin material when the substrate pre-coated with the hot melt adhesive is stacked up and stored. However, in the ever-evolving industry, more and more efforts are required to keep providing a better product having a higher performance and better usability.

The present invention has been made in view of the foregoing, and it is an object of the present invention to provide a door trim including a base and a skin that are firmly bonded via a non-reactive hot melt adhesive layer with less dependence on a material forming a bonding surface, and a method for manufacturing the door trim.

The present invention includes the following.

[1] A door trim including a base and a skin bonded to a surface of the base, wherein the base has a bonding surface S to the skin, the bonding surface S including a region $S_1$ having no polar group and/or a region $S_2$ having a polar group, the skin has a bonding surface T to the base, the bonding surface T being bonded with the bonding surface S via a non-reactive hot melt adhesive layer, and the non-reactive hot melt adhesive layer contains acid-modified polyolefin.

[2] The door trim according to [1], wherein the bonding surface S includes the region $S_1$ and the region $S_2$.

[3] The door trim according to [1] or [2], wherein the region $S_1$ is made of polyolefin.

[4] The door trim according to any one of [1] to [3], wherein the region $S_2$ is formed using polyurethane.

[5] The door trim according to any one of [1] to [4], wherein the bonding surface T is formed using polyolefin.

[6] The door trim according to any one of [1] to [5], wherein the bonding surface T includes a surface of a fiber assembly.

[7] The door trim according to any one of [1] to [6], wherein the acid-modified polyolefin is maleic anhydride-modified polypropylene.

[8] The door trim according to [7], wherein the maleic anhydride-modified polypropylene is more than 5% by mass and less than 20% by mass when a total mass of the non-reactive hot melt adhesive layer is 100% by mass.

[9] The door trim according to [7] or [8], wherein the maleic anhydride-modified polypropylene has an acid value of 5 or more and 20 or less.

[10] The door trim according to any one of [7] to [9], wherein the maleic anhydride-modified polypropylene has a melt flow rate of 20 g/10 min or more at 180° C.

[11] The door trim according to [1], wherein the bonding surface S includes the region $S_2$.

[12] The door trim according to [11], wherein the region $S_2$ is formed using polyurethane.

[13] The door trim according to or [12], wherein the bonding surface T is formed using polyolefin.

[14] The door trim according to any one of to [13], wherein the bonding surface T includes a surface of a fiber assembly.

[15] The door trim according to any one of to [14], wherein the acid-modified polyolefin is maleic anhydride-modified polypropylene.

[16] The door trim according to [15], wherein the maleic anhydride-modified polypropylene is 5% by mass or more and 40% by mass or less when a total mass of the non-reactive hot melt adhesive layer is 100% by mass.

[17] The door trim according to or [16], wherein the maleic anhydride-modified polypropylene has an acid value of 5 or more and 20 or less.

[18] The door trim according to any one of to [17], wherein the maleic anhydride-modified polypropylene has a melt flow rate of 20 g/10 min or more at 180° C.

[19] The door trim according to [1], wherein the bonding surface S includes the region $S_1$, and the non-reactive hot melt adhesive layer contains, as a base resin, the acid-modified polyolefin and a non-acid-modified polyolefin.

[20] The door trim according to [19], wherein the region $S_1$ is made of polyolefin.

[21] The door trim according to or [20], wherein the bonding surface T is formed using polyolefin.

[22] The door trim according to any one of to [21], wherein the bonding surface T includes a surface of a fiber assembly.

[23] The door trim according to any one of to [22], wherein the acid-modified polyolefin is maleic anhydride-modified polypropylene.

[24] The door trim according to [23], wherein the maleic anhydride-modified polypropylene is less than 20% by mass when a total mass of the non-reactive hot melt adhesive layer is 100% by mass.

[25] The door trim according to or [24], wherein the maleic anhydride-modified polypropylene has an acid value of 5 or more and 20 or less.

[26] The door trim according to any one of to [25], wherein the maleic anhydride-modified polypropylene has a melt flow rate of 20 g/10 min or more at 180° C.

[27] A method for manufacturing a door trim including a base and a skin bonded to a surface of the base, the base having a bonding surface S to the skin, the bonding surface S including a region $S_1$ having no polar group and/or a region $S_2$ having a polar group, the skin having a bonding surface T to the base, the method including bonding the bonding surface T with the bonding surface S using a non-reactive hot melt adhesive containing acid-modified polyolefin.

[28] The method for manufacturing a door trim according to [27], wherein the bonding surface S includes the region $S_1$ and the region $S_2$.

[29] The method for manufacturing a door trim according to or [28], wherein the region $S_1$ is made of polyolefin.

[30] The method for manufacturing a door trim according to any one of to [29], wherein the region $S_2$ is formed using polyurethane.

[31] The method for manufacturing a door trim according to any one of to [30], wherein the bonding surface T is formed using polyolefin.

[32] The method for manufacturing a door trim according to any one of to [31], wherein the bonding surface T includes a surface of a fiber assembly.

[33] The method for manufacturing a door trim according to any one of to [32], wherein the acid-modified polyolefin is maleic anhydride-modified polypropylene.

[34] The method for manufacturing a door trim according to [33], wherein the maleic anhydride-modified polypropylene is more than 5% by mass and less than 20% by mass when a total mass of the non-reactive hot melt adhesive is 100% by mass.

[35] The method for manufacturing a door trim according to or [34], wherein the maleic anhydride-modified polypropylene has an acid value of 5 or more and 20 or less.

4

[36] The method for manufacturing a door trim according to any one of to [35], wherein the maleic anhydride-modified polypropylene has a melt flow rate of 20 g/10 min or more at 180° C.

[37] The method for manufacturing a door trim according to [27], wherein the bonding surface S includes the region $S_2$.

[38] The method for manufacturing a door trim according to [37], wherein the region $S_2$ is formed using polyurethane.

[39] The method for manufacturing a door trim according to or [38], wherein the bonding surface T is formed using polyolefin.

[40] The method for manufacturing a door trim according to any one of to [39], wherein the bonding surface T includes a surface of a fiber assembly.

[41] The method for manufacturing a door trim according to [37], wherein the acid-modified polyolefin is maleic anhydride-modified polypropylene.

[42] The method for manufacturing a door trim according to [41], wherein the maleic anhydride-modified polypropylene is 5% by mass or more and 40% by mass or less when a total mass of the non-reactive hot melt adhesive is 100% by mass.

[43] The method for manufacturing a door trim according to or [42], wherein the maleic anhydride-modified polypropylene has an acid value of 5 or more and 20 or less.

[44] The method for manufacturing a door trim according to any one of to [43], wherein the maleic anhydride-modified polypropylene has a melt flow rate of 20 g/10 min or more at 180° C.

[45] The method for manufacturing a door trim according to wherein, the bonding surface S includes the region $S_1$, and the non-reactive hot melt adhesive contains, as a base resin, the acid-modified polyolefin and a non-acid-modified polyolefin.

[46] The method for manufacturing a door trim according to [45], wherein the region $S_1$ is made of polyolefin.

[47] The method for manufacturing a door trim according to or [46], wherein the bonding surface T is formed using polyolefin.

[48] The method for manufacturing a door trim according to any one of to [47], wherein the bonding surface T includes a surface of a fiber assembly.

[49] The method for manufacturing a door trim according to any one of to [48], wherein the acid-modified polyolefin is maleic anhydride-modified polypropylene.

[50] The method for manufacturing a door trim according to [45], wherein the maleic anhydride-modified polypropylene is less than 20% by mass when a total mass of the non-reactive hot melt adhesive is 100% by mass.

[51] The method for manufacturing a door trim according to or [50], wherein the maleic anhydride-modified polypropylene has an acid value of 5 or more and 20 or less.

[52] The method for manufacturing a door trim according to any one of to [51], wherein the maleic anhydride-modified polypropylene has a melt flow rate of 20 g/10 min or more at 180° C.

With the door trim of the present invention, the base and the skin can be firmly bonded via a non-reactive hot melt adhesive layer with less dependence on a material forming a bonding surface.

With the method for manufacturing a door trim of the present invention, the base and the skin can be firmly bonded via a non-reactive hot melt adhesive layer with less dependence on a material forming a bonding surface.

BRIEF DESCRIPTION OF THE DRAWINGS

The present invention will be further described in the following detailed description with reference to the following figures, given non-limiting examples of exemplary embodiments according to the invention, and like reference symbols represent identical parts through several figures.

DETAILED DESCRIPTION OF PREFERRED EMBODIMENTS

Figure 1:
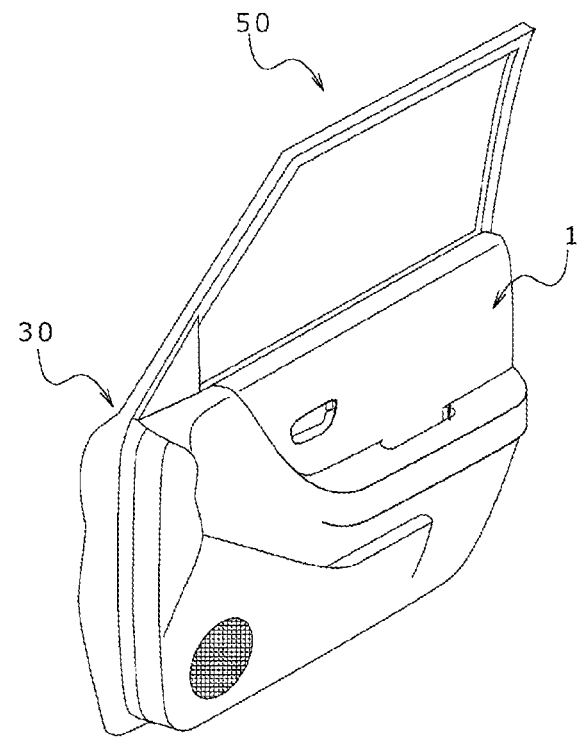
FIG. 1 is a view showing an example of a door to which a door trim according to the present invention is mounted.
Figure 2:
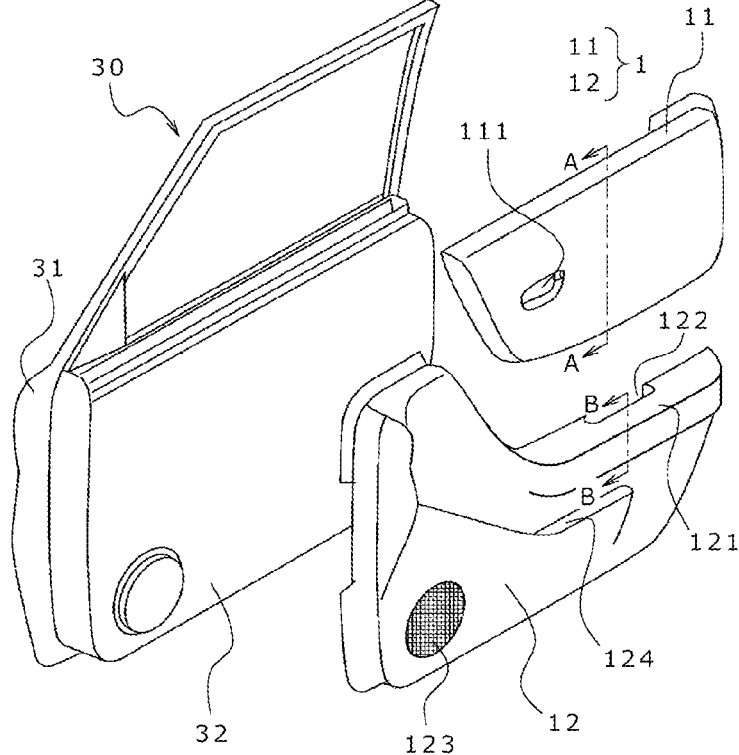
FIG. 2 is an exploded view of the door shown in FIG. 1.
Figure 3:
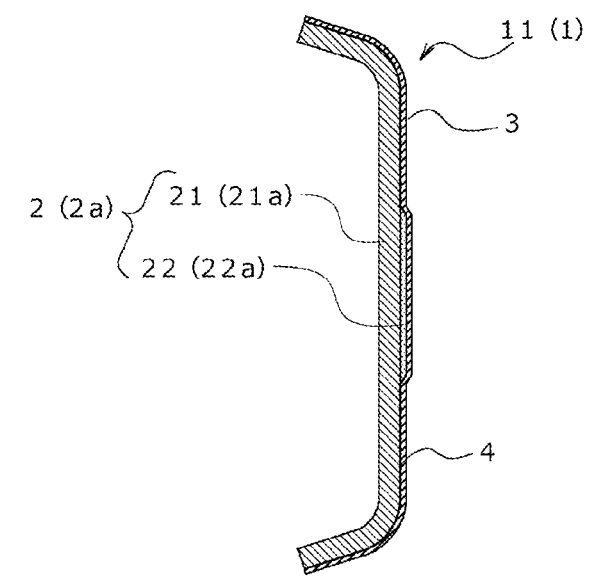
FIG. 3 is a sectional view taken along line A-A in FIG. 2.
Figure 4:
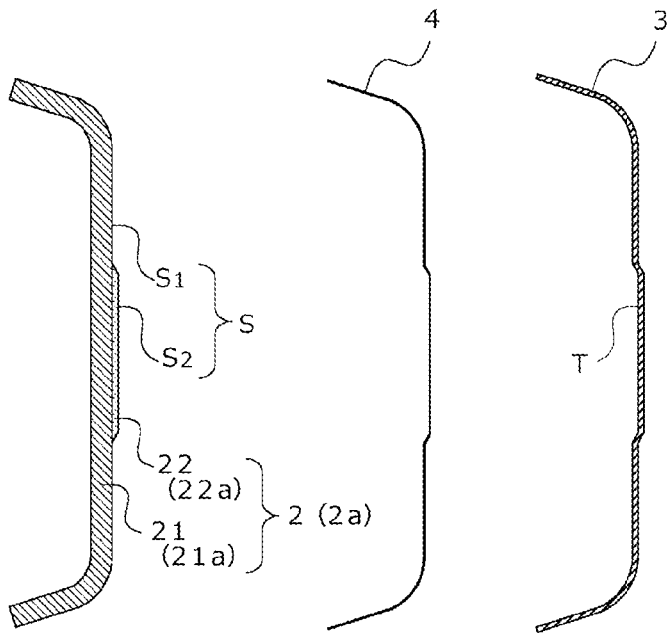
FIG. 4 is an exploded view of an upper board shown in FIG. 3.
Figure 5:
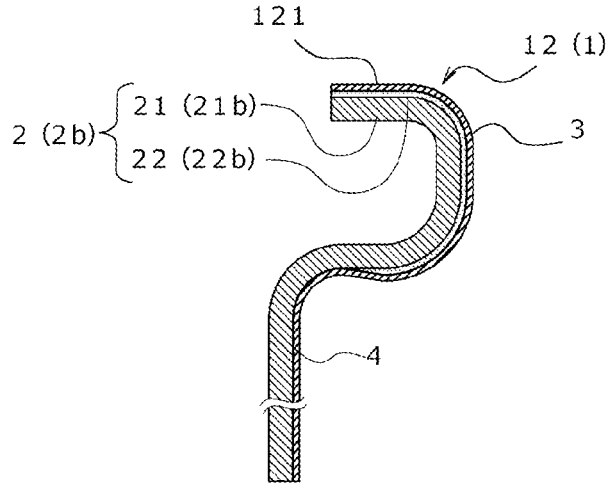
FIG. 5 is a sectional view taken along line B-B in FIG. 2.
Figure 6:
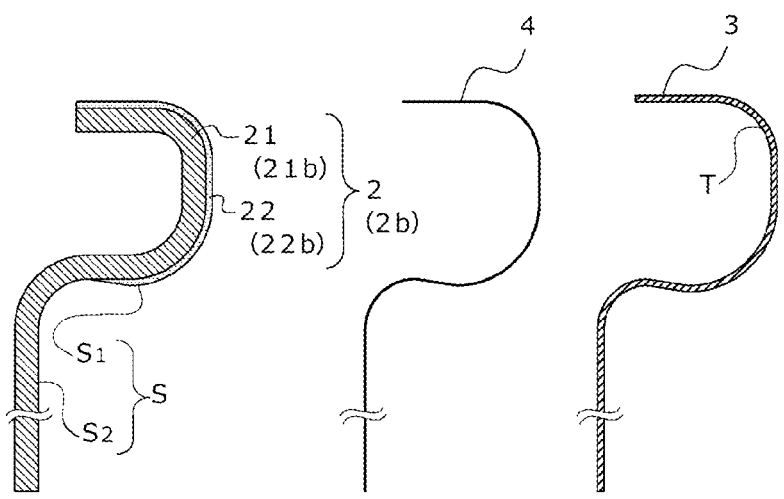
FIG. 6 is an exploded view of a lower board shown in FIG. 5.

Subjects shown herein are illustrative one and one for describing embodiments of the invention exemplarily, and are described for providing one believed to be explanation in which the principles and conceptual characteristics of the invention can be understood most effectively and without any difficulty. In this regard, no attempt is made to show structural details of the invention in more detail than is necessary for the fundamental understanding of the invention, and the description is taken with the drawings making apparent to those skilled in the art how several forms of the invention may be embodied in practice.

1 Door Trim

A door trim (1) according to the present invention includes a base (2) and a skin (3) bonded to a surface of the base (2).

The base (2) has a bonding surface S to the skin (3). The bonding surface S includes a region $S_1$ having no polar group and/or a region $S_2$ having a polar group.

The skin (3) has a bonding surface T to the base (2). The bonding surface T is bonded with the bonding surface S via a non-reactive hot melt adhesive layer (4). The non-reactive hot melt adhesive layer (4) contains acid-modified polyolefin.

The "door trim (1)" is a member disposed on an interior side of a door of a vehicle such as an automobile and covering the door, and is a member that imparts a design to the interior of the vehicle and various functions such as a housing function, a rest function, and an impact absorption function. The door trim includes a base 2 and a skin 3 bonded to a surface of the base 2, and a surface of the door trim is exposed to the interior side to provide a design. The surface provided with the design is a design surface, and is formed by the skin 3 in the door trim according to the present invention.

The "base (2)" is a component included in the door trim 1, and is typically a main part of the door trim. The base 2 has a bonding surface S as a surface bonded with the skin 3. The bonding surface S includes a region $S_1$ having no polar group and/or a region $S_2$ having a polar group. In other words, the bonding surface S will be in three modes: <1> including the region $S_1$ and the region $S_2$, <2> including only the region $S_2$, and <3> including only the region $S_1$.

The "bonding surface S" is a surface included in the surface of the base 2 and bonded to the skin 3. That is, when the entire surface of the base 2 is bonded to the skin 3, the entire surface of the base 2 is the bonding surface S. When a part of the surface of the base 2 is bonded to the skin 3, the part of the surface of the base 2 is the bonding surface S. Typically, the bonding surface S covers 50% or more (optionally 100%) of the entire surface of the base 2.

The "region $S_1$" is a region having no polar group. That is, the region $S_1$ is made of a material having no polar group (hereinafter, also simply referred to as a "non-polar material"). The non-polar material may be an inorganic material, but is preferably an organic material, and more preferably a resin. That is, it is preferred that the region $S_1$ is made of a resin having no polar group (hereinafter, also simply referred to as a "non-polar resin").

The portion of the base 2 including the region $S_1$ (the portion corresponding to the region $S_1$ of the bonding surface S on the base 2) may be entirely made of a non-polar material in the thickness direction, or only a surface portion at the bonding surface S side in the thickness direction may be made of a non-polar material and the other portion may be made of a material having a polar group (hereinafter, also simply referred to as a "polar material").

Examples of the non-polar resin include polyolefins. Only a single type may be used or two or more types may be used.

Examples of the polar group include a carboxy group, an acid anhydride group (e.g., maleic anhydride, phthalic anhydride, and succinic anhydride), a hydroxy group, an isocyanate group, an amino group, and a halogen group.

As the non-polar resin, polyolefins are preferable in the examples above in terms of moldability, handleability, costs, versatility, and the like.

Polyolefins include olefin homopolymers and olefin copolymers. Olefin copolymers include polyolefin elastomer.

Olefins are unsaturated hydrocarbons having one carbon-carbon double bond and examples thereof include ethylene, propylene, 1-butene, 3-methyl-1-butene, 1-pentene, 3-methyl-1-pentene, 4-methyl-1-pentene, 1-hexene, and 1-octene. Only a single type may be used or two or more types may be used.

In other words, polyolefins include, for example, polyethylene and polypropylene. Only a single type of polymer may be used or two or more types of polymers may be used.

Polyethylene includes ethylene homopolymers and copolymers of ethylene and other olefins (i.e., ethylene copolymers). Types of other olefins constituting the ethylene copolymers are not limited, and the olefins described above (excluding ethylene) can be used. The ethylene copolymers may be a random copolymer or a block copolymer. The ethylene copolymers is a polymer including 50% or more of ethylene-based units of the total number of constitutional units.

Polypropylene includes propylene homopolymers and copolymers of propylene and other olefins (i.e., propylene copolymers). Types of other olefins constituting the propylene copolymers are not limited, and the olefins described above (excluding propylene) can be used. The propylene copolymers may be a random copolymer or a block copolymer. The propylene copolymers are polymers including 50% or more of propylene-based units of the total number of constitutional units.

The "region $S_2$" is a region having a polar group. That is, the region $S_2$ is made of a material having a polar group (hereinafter, also simply referred to as a "polar material"). The polar material may be an inorganic material, but is preferably an organic material, and more preferably a resin. That is, it is preferred that the region $S_2$ is made of a resin having a polar group (hereinafter, also simply referred to as a "polar resin").

The portion of the base 2 including the region $S_2$ (the portion corresponding to the region $S_2$ of the bonding surface S on the base 2) may be entirely made of a polar material in the thickness direction, or only a surface portion at the bonding surface S side in the thickness direction may be made of a polar material and the other portion may be made of a non-polar material.

Examples of the polar resin include polyurethane, polyethylene terephthalate, polyamide, polycarbonate, acrylic resin, methacrylic resin, polyacrylate, and polymethacrylate. Only a single type may be used or two or more types may be used.

Examples of the polar group include a carboxy group, an acid anhydride group (e.g., maleic anhydride, phthalic anhydride, and succinic anhydride), a hydroxy group, an isocyanate group, an amino group, and a halogen group. Only a single type may be used or two or more types may be used.

As the polar resin, polyurethane is preferable in the examples above in terms of moldability, handleability, costs, versatility, and the like.

Polyurethane is a polymer containing the urethane linkage. Polyurethane may contain one kind or two or more kinds of other linkages (such as the urea linkage) in addition to the urethane linkage.

Polyurethane can be obtained using polyols and polyisocyanates.

Polyols are compounds containing two or more hydroxy groups in the molecule, and examples thereof include aliphatic polyols, polyester polyols, polyether polyols, olefin polyols, and acrylic polyols. Only a single type may be used or two or more types may be used.

Polyisocyanates are compounds (including, for example, monomer, polymer, and prepolymer) containing two or more isocyanate groups in the molecule, and examples thereof include aromatic polyisocyanates, aliphatic polyisocyanates, and alicyclic polyisocyanates. Only a single type may be used or two or more types may be used. Examples of aromatic polyisocyanates include diphenylmethane diisocyanate (monomeric MDI, polymeric MDI, crude MDI), tolylene diisocyanate (TDI), and phenylene diisocyanate. Only a single type may be used or two or more types may be used. Examples of aliphatic polyisocyanates include hexamethylene diisocyanate and trimethylhexamethylene diisocyanate. Only a single type may be used or two or more types may be used. Examples of alicyclic polyisocyanates include dicyclohexylmethane diisocyanate, isophorone diisocyanate, norbornene diisocyanate. Only a single type may be used or two or more types may be used.

As described above, the base 2 is in the following modes <1> to <3>.

<1> The bonding surface S includes the region $S_1$ and the region $S_2$.

<2> The bonding surface S includes only the region $S_2$.

<3> The bonding surface S includes only the region $S_1$.

Mode <1>

When the base 2 is in the mode <1> above, the base 2 includes, for example, a non-polar material part (e.g., a polyolefin material part) formed using a non-polar material (e.g., polyolefin) and a polar material part (e.g., a polyurethane material part) formed using a polar material (e.g., polyurethane) (see FIGS. 3 to 6). That is, for example, the base 2 includes the non-polar material part and the polar material part attached to a part of a surface (surface to be the bonding surface S) of the non-polar material part. In this case, the exposed surface of the non-polar material part is the region $S_1$, and the exposed surface of the polar material part is the region $S_2$.

More specifically, examples of the polyolefin material part include <1-1> a molded part made of polyolefin (polyolefin molded part), and <1-2> a fiber molded part (shaped product of a fiber board) formed by binding a plurality of plant fibers with polyolefin serving as a binder resin.

Examples of the polyurethane material part include [1] a molded part made of polyurethane (polyurethane molded part), and [2] a foam layer made of polyurethane (e.g., urethane pad).

Mode <2>

When the base 2 is in the mode <2> above, the base 2 is, for example, <2-1> a molded part (polar material part (polyurethane material part)) made of a polar material (e.g., polyurethane). For another example, the base 2 is <2-2> a member having a foam layer (polar material part (polyurethane material part (such as urethane pad))) made of a polar material (e.g., polyurethane) bonded to the entire surface of a molded part (non-polar material part (polyolefin material part)) made of a non-polar material (e.g., polyolefin) (see FIGS. 7 and 8). In these cases, the exposed surface of the polar material part is the region $S_2$.

Figure 7:
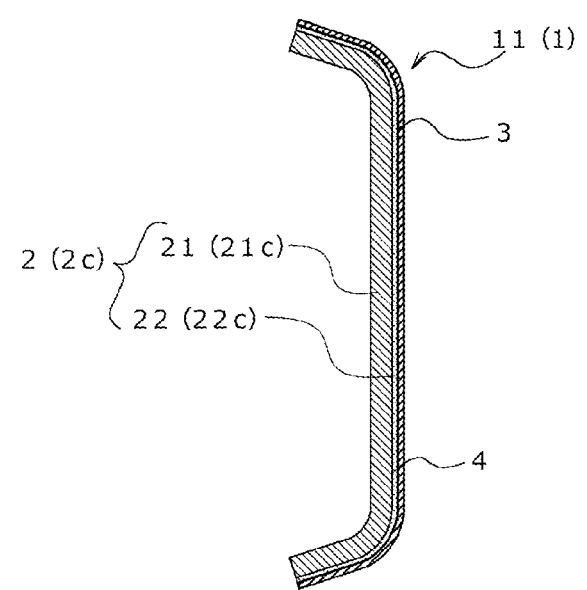
FIG. 7 is a sectional view showing another example of the section taken along line A-A in FIG. 2.
Figure 8:
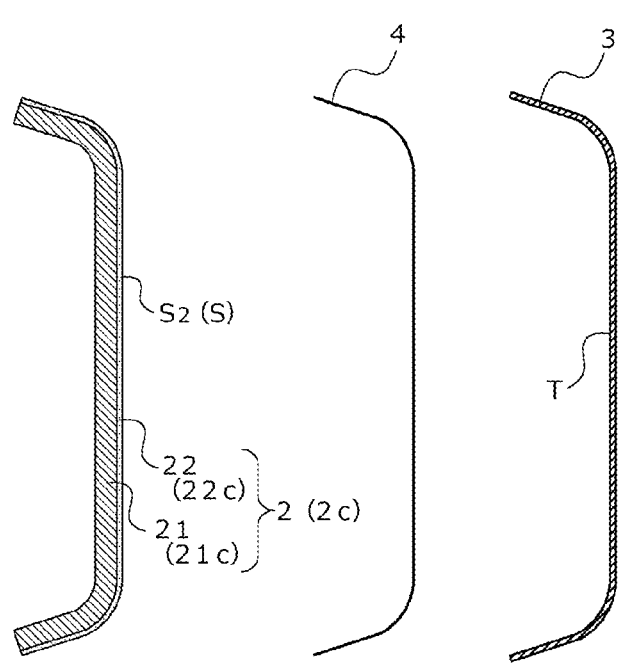
FIG. 8 is an exploded view of an upper board shown in FIG. 7.

That is, for example, the base 2 includes a layer 22, (e.g., a urethane pad layer 22 (22c)), made of a polar material bonded to the entire surface on a face of a body 21 (21c) that is a molded part made of a non-polar material or to the entire surface on a face of a body 21 (21c) that is a fiber molded part (shaped product of a fiber board). In the base 2, the entire bonding surface S is a surface of the layer 22 (22c) made of a polar material, and corresponds to the region $S_2$. Specifically, as illustrated in FIGS. 7 and 8, the exposed surface of the layer 22 (22c) made of a polar material corresponds to the region $S_2$ as in FIGS. 3 to 6.

Mode <3>

Figure 9:
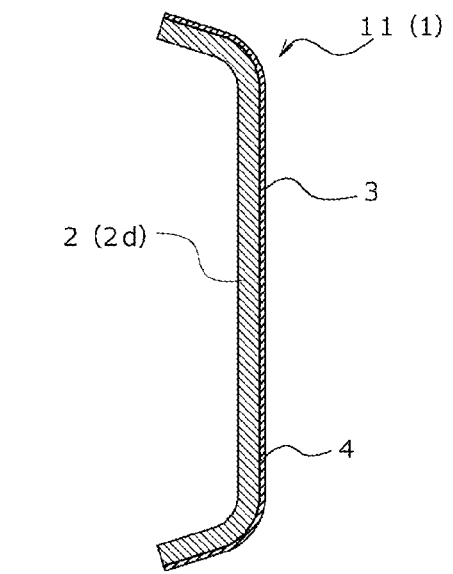
FIG. 9 is a sectional view showing yet another example of the section taken along line A-A in FIG. 2.
Figure 10:
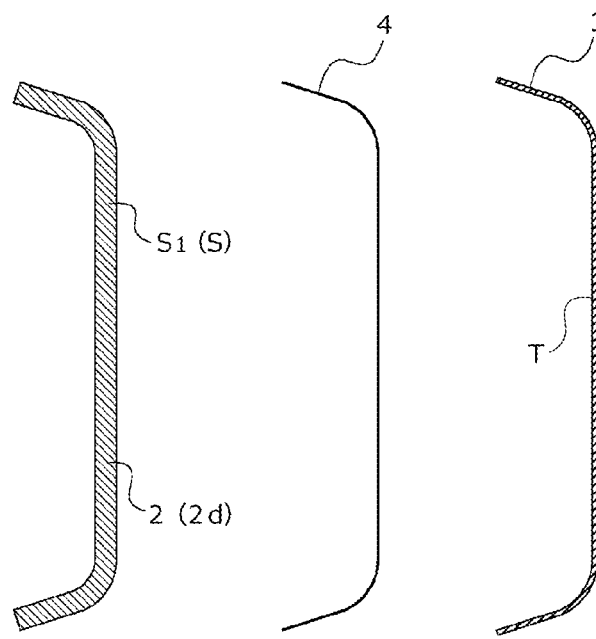
FIG. 10 is an exploded view of an upper board shown in FIG. 9.

When the base 2 is in the mode <3> above, the base 2 is, for example, <3-1> a molded part (non-polar material part (e.g., polyolefin material part)) made of a non-polar material (e.g., polyolefin) (see FIGS. 9 and 10). For another example, the base 2 is <3-2> a member having a foam layer (non-polar material part (e.g., polyolefin material part)) made of a non-polar material that is attached to the entire surface of a molded part (polar material part) made of a polar material. In these cases, the exposed surface of the non-polar material part is the region $S_1$.

That is, for example, a polyolefin molded part or a fiber molded part (shaped product of a fiber board) is the base 2 (2d) in itself. In the base material 2 (2d), since the polyolefin material is on the entire bonding surface S, the bonding surface S corresponds to the region $S_1$. Specifically, this example is illustrated in FIGS. 9 and 10.

Among the examples above, the mode <1> will be more specifically described. In <1-1> above, the base 2 is generally made of a polyolefin molded part, and a urethane pad layer made of polyurethane is attached to a part of the base 2. In this base 2, the polyolefin molded part corresponds to the polyolefin material part, and a surface of the polyolefin molded part corresponds to the region $S_1$. The urethane pad layer corresponds to the polyurethane material part, and the surface of the urethane pad layer corresponds to the region $S_2$.

Specific examples are illustrated in FIGS. 1 to 6. A door 50 is a right front door of a vehicle. Doors on, for example, the right rear side, the left front side, and the left rear side can have the same configuration. The door 50 can include a door panel 30 and the door trim 1.

The door trim 1 is an interior material that is mounted on the vehicle interior side of the door panel 30 to be a part of a wall surface of the vehicle cabin, and imparts decorativeness and comfort to the vehicle cabin. The door panel 30 can include a plate-shaped door outer panel 31 and a plate-shaped door inner panel 32. These panels are formed by pressing a metal panel such as a steel or aluminum panel. Between the door inner panel 32 and the door outer panel 31, various components such as window glass (not illustrated) and an elevating mechanism (not illustrated) for moving the window glass up and down can be disposed.

The door trim 1 can include an upper board 11 and a lower board 12. The upper board 11 and the lower board 12 are assembled to each other. The upper board 11 and the lower board 12 are configured by polyolefin (e.g., polypropylene). The upper board 11 can include an inside handle portion 111. The lower board 12 can include, for example, an armrest portion 121, a door pull handle portion 122, a speaker grille portion 123, and a door pocket portion 124. All of these are functional portions. For example, the armrest portion 121 is a portion that provides a space for an occupant seated on the seat to place an elbow, and is formed to bulge toward the interior side.

A surface of the armrest portion 121 can have a urethane pad layer 22 (22a) to provide cushioning for the lower side of the elbow when the occupant places the elbow thereon. In this configuration, the lower board 12 includes a body 21 (21a) made of polyolefin and the urethane pad layer 22 (22a) disposed on a surface of the body 21 (21a). In this regard, the exposed surface of the body 21 (21a) that is a polyolefin molded part corresponds to the region $S_1$, and the exposed surface of the urethane pad layer 22 (22a) corresponds to the region $S_2$.

In the same manner, a surface of the upper board 11 can have a urethane pad layer 22 (22b) to provide cushioning for the side of the elbow when the occupant places the elbow on the armrest portion 121. In this configuration, the upper board 11 includes a body 21 (21b) made of polyolefin and the urethane pad layer 22 (22b) disposed on a surface of the body 21 (21b). In this regard, the exposed surface of the body 21 (21b) that is a polyolefin molded part corresponds to the region $S_1$, and the exposed surface of the urethane pad layer 22 (22b) corresponds to the region $S_2$.

The polyolefin material part in <1-2> above is a component including a body 21 that is a fiber molded part (shaped product of a fiber board) formed by binding a plurality of reinforcing fibers with polyolefin serving as a binder resin, and a pad layer (urethane pad layer) 22 made of polyurethane attached to a part of a surface of the body 21. In this component, the exposed surface of the body 21 that is the fiber molded part corresponds to the region $S_1$, and the exposed surface of the urethane pad layer 22 corresponds to the region $S_2$. This component can be shaped and configured in the same manner as described above.

Types of the reinforcing fibers are not limited, and, for example, plant fibers, resin fibers (e.g., polyester fibers and polyamide fibers), and inorganic fibers (e.g., glass fibers and carbon fibers) can be used. Only a single type may be used or two or more types may be used. Among the examples above, the plant fibers are fibers taken out from a plant body (e.g., trunk, stem, branch, leaf, and root), and include, for example, leaf-vein-based plant fibers, bast plant fibers, and wood-based plant fibers. The plant body from which the plant fibers are derived is not limited, and examples thereof include kenaf, hemp, jute hemp, ramie, flax, manilla hemp, sisal hemp, gampi, mitsumata, kozo, banana, pineapple, coconut, corn, sugar cane, bagasse, palm, *papyrus*, reed, esparto, sabai grass, wheat, rice, bamboo, various types of softwood (such as Japanese cedar and Japanese cypress), hardwood, and cotton. Only a single type may be used or two or more types may be used.

The ratio between the total amount of the reinforcing fibers and the total amount of the polyolefin contained in the fiber board is not limited, but when the sum of the total amount of the reinforcing fibers and the total amount of the polyolefin is defined as 100% by mass, the proportion of the total amount of the reinforcing fibers can be 10 to 90% by mass, preferably 25 to 75% by mass, and more preferably 35 to 65% by mass.

The "skin (3)" is a member that covers a surface of the base 2. In the surface of the skin 3, the bonding surface T to be bonded to the base 2 may be a region having no polar group, may be a region having a polar group, or may be a mixed region including both regions. That is, the bonding surface T may include only a region made of a non-polar material, may include only a region made of a polar material, or may include a mixed region having both regions. It is preferred that the non-polar material is a non-polar resin (e.g., polyolefin) and the polar material is a polar resin (e.g., polyurethane, polyethylene terephthalate, and polyamide), which is the same as in the case of the base 2. Specific examples of the non-polar resin and the polar resin are also the same as those described above.

More specifically, the skin 3 is in the following modes <4> and <5>.

<4> The bonding surface T is made of a non-polar material.

<5> The bonding surface T includes a surface of a fiber assembly.

Mode <4>

When the skin 3 is in the mode <4>, the bonding surface T is, for example, made of polyolefin, which is a non-polar material. For polyolefin, descriptions regarding polyolefin in the description of the base 2 can be applied. Among them, polyolefin elastomer is preferable.

More specifically, the skin 3 includes, for example, a design layer and a foam layer that are laminated. Of these layers, the design layer can be made of various materials, and can be made of, for example, polyolefin or polyvinyl chloride. The foam layer can also be made of various materials, and can be made of, for example, polyolefin, which is a non-polar resin, and in particular, the foam layer can be made of polyolefin elastomer.

In the mode <4>, a surface of the foam layer made of polyolefin elastomer is the bonding surface T. That is, the exposed surface of the foam layer made of a non-polar resin is the bonding surface T.

The design layer is a layer exposed to the interior side, and may have a color or a pattern. When the design layer has a pattern, the pattern may be a smooth pattern or an uneven pattern.

Mode <5>

When the skin 3 is in the mode <5>, the skin 3 includes, for example, a design layer, a foam layer, and a fiber assembly (fiber assembly layer) laminated in this order. Of these layers, the design layer can be configured the same as the design layer in the mode <4>. The foam layer can be made of various materials. For example, the foam layer can be made of polyolefin, which is a non-polar resin, as in the mode <4>, or can be made of polyurethane (e.g., a foam layer made of slab urethane), which is a polar resin. As the fiber assembly (fiber assembly layer), for example, a non-woven fabric layer, a woven fabric layer, and a knitted fabric layer can be used. Only a single type may be used or two or more types may be used. The material of the fibers consti-tuting the fiber assembly is not limited, and may be a non-polar material, a polar material, or a mixture thereof. Examples of the fibers constituting the fiber assembly include polyester fibers such as polyethylene terephthalate fibers, polyamide fibers such as nylon 6 fibers, and poly-olefin fibers such as polypropylene fibers. Only a single type may be used or two or more types may be used.

In the mode <5>, a surface of the fiber assembly is the bonding surface T. Since the interstices between the fibers of the fiber assembly pass through across the surfaces, the bonding surface T can have the anchoring effect to a non-reactive hot melt adhesive layer 4 independent of the constituent material thereof.

The design layer is a layer exposed to the interior side, and may have a color or a pattern. When the design layer has a pattern, the pattern may be a smooth pattern or an uneven pattern.

The "non-reactive hot melt adhesive layer (4)" (adhesive layer 4) is a layer that is interposed between the bonding surface S and the bonding surface T and bonds the bonding surface S with the bonding surface T. This layer is made of a non-reactive hot melt adhesive (hereinafter, also simply referred to as an "adhesive"). The adhesive layer 4 contains acid-modified polyolefin. In the door trim 1 according to the present invention, since the adhesive layer 4 contains acid-modified polyolefin, the bonding surface S and the bonding surface T can be firmly bonded. In particular, as compared to a case in which the adhesive layer 4 contains no acid-modified polyolefin, the region $S_2$ (region formed using polyurethane) and the bonding surface T (the bonding sur-face of the skin 3, when, for example, the fibers constituting the fiber assembly are made of a polar resin) can be firmly bonded.

The adhesive is a hot melt adhesive having no reactivity. The hot melt adhesive can contain, for example, a base resin, a tackifier, and a plasticizer. When at least one of these components (e.g., base resin) has a reactive group and is bondable (by, for example, curing or crosslinking) to each other, the hot melt adhesive can have reactivity. Such an adhesive is referred to as a reactive hot melt adhesive. When the reactive hot melt adhesive is used as an adhesive, the reactive group reacts to form a strong adhesive layer. In particular, an adhesive layer having good adhesiveness and heat resistance can be formed. However, it is only a limited time for the reactive hot melt adhesive to keep its unreacted state. Thus, an unused adhesive that has been stored more than a predetermined period such as a storage period or a pot life has to be discarded, resulting in a cost increase including management and disposal costs.

The non-reactive hot melt adhesive is an adhesive having no such reactivity as described above. That is, the compo-nents contained in this hot melt adhesive do not have any reactive group. Since the non-reactive hot melt adhesive does not have such reactivity as described above, it is difficult to obtain sufficient heat resistance. To address this issue, the adhesive layer 4 according to the present invention contains acid-modified polyolefin. As a result, the adhesive layer 4 made of such an adhesive can have a good bond strength. In addition, the adhesive layer 4 can have a good heat resistance.

The "acid-modified polyolefin" is a polyolefin having an acid-modified group. Examples of the acid-modified group include a carboxyl group (—COOH) and an acid anhydride group (—CO—O—OC—). Only a single type may be used or two or more types may be used.

The acid-modified group can be introduced by a method such as (1) copolymerization using a monomer having an acid-modified group, (2) grafting a compound (e.g., mono-mer, polymer) having an acid-modified group to a polymer, and (3) oxidative decomposition of a polymer. These meth-ods may be used alone or in combination of two or more, but (1) and/or (2) are preferable.

Examples of the monomer for introducing the acid-modified group include a monomer having a polymerizable unsaturated bond and an acid anhydride group, and a mono-mer having a polymerizable unsaturated bond and a car-boxyl group.

Specifically, examples thereof include acid anhydrides such as maleic anhydride, itaconic anhydride, succinic anhy-dride, glutaric anhydride, adipic anhydride, citraconic anhy-dride, tetrahydrophthalic anhydride, and butenyl succinic anhydride, and carboxylic acids such as maleic acid, itaconic acid, fumaric acid, acrylic acid, and methacrylic acid. Only a single type may be used or two or more types may be used. Of these compounds, acid anhydrides are preferable, maleic anhydride and itaconic anhydride are more preferable, and maleic anhydride is particularly preferable.

For polyolefin constituting the skeleton of the acid-modi-fied polyolefin, descriptions regarding polyolefin in the description of the region $S_1$ can be applied. Of the examples in the description, polypropylene is preferable. As described above, polypropylene includes propylene homopolymers and copolymers of propylene and other olefins (i.e., propyl-ene copolymers, provided that a propylene-based unit accounts for 50% or more of the total number of constitu-tional units). Types of other olefins constituting the propyl-ene copolymers are not limited, but an olefin having 4 to 8 carbon atoms is preferable, and examples thereof include 1-butene, 3-methyl-1-butene, 1-pentene, 3-methyl-1-pen-tene, 4-methyl-1-pentene, 1-hexene, and 1-octene. Only a single type may be used or two or more types may be used.

That is, as the acid-modified polyolefin, maleic anhy-dride-modified polyolefin and acid-modified polypropylene are preferable, and maleic anhydride-modified polypropyl-ene is more preferable.

Properties of the acid-modified polyolefin are not limited, but the acid value (mg KOH/g) of the acid-modified poly-olefin is preferably 5 or more. When the acid-modified polyolefin has the acid value of 5 or more, the resulting adhesive layer 4 can have an increased bond strength and heat resistance. The acid value is more preferably 7 or more, and still more preferably 9 or more. The upper limit of the acid value is not limited, but is preferably 20 or less, more preferably 17 or less, and still more preferably 14 or less from the viewpoint of, for example, handleability. These upper and lower limit values can be optionally combined. For example, the upper and lower limit values may be 5 to 20, may be 7 to 17, or may be 9 to 14. The acid value (mg KOH/g) is a value measured in accordance with JIS K 2501.

The melt flow rate (MFR) (180° C./2.12 N) of the acid-modified polyolefin is preferably 20 g/10 min or more. When the acid-modified polyolefin has the MFR of 20 g/10 min or more, the resulting adhesive layer 4 can have an increased bond strength and heat resistance. The MFR is more preferably 30 g/10 min or more, and still more preferably 40 g/10 min or more. The upper limit of the MFR is not limited, but is preferably 70 g/10 min or less and more preferably 55 g/10 min or less from the viewpoint of, for example, handleability. These upper and lower limit values can be optionally combined. For example, the upper and lower limit values may be 20 to 70 g/10 min, may be 30 to 55 g/10 min, or may be 40 to 55 g/10 min. The MFR (180° C./2.12 N) is a value measured in accordance with ISO 1133.

The acid-modified polyolefin preferably has a melting point of 120° C. or higher. When the acid-modified polyolefin has a melting point of 120° C. or higher, the resulting adhesive layer 4 can have an increased bond strength and heat resistance. The melting point is more preferably 135° C. or higher, and still more preferably 145° C. or higher. The upper limit of the melting point is not limited, but is preferably 170° C. or lower, and more preferably 160° C. or lower from the viewpoint of, for example, handleability. These upper and lower limit values can be optionally combined. For example, the upper and lower limit values may be 120 to 170° C., may be 135 to 160° C., or may be 145 to 160° C. The melting point is a value measured in accordance with JIS K 7121.

The amount of the acid-modified polyolefin contained in the adhesive layer 4 is not limited, but is preferably 5% by mass or more when the total mass of the adhesive layer 4 is 100% by mass. When the content of the acid-modified polyolefin is 5% by mass or more, the resulting adhesive layer 4 can have an increased bond strength and heat resistance. The upper limit of the content is not limited, but is preferably 30% by mass or less from the viewpoint of, for example, handleability.

The base 2 has been described in the following modes: <1> the bonding surface S includes the region $S_1$ and the region $S_2$; <2> the bonding surface S includes only the region $S_2$; and <3> the bonding surface S includes only the region $S_1$.

The content of the acid-modified polyolefin in the adhesive layer 4 used in the mode <1> is preferably more than 5% by mass, more preferably 7% by mass or more, still more preferably 9% by mass or more, and particularly preferably 12% by mass or more from the viewpoint of bond strength. The upper limit of the content is not limited, but is preferably less than 20% by mass, more preferably 19% by mass or less, still more preferably 18% by mass or less, and particularly preferably 17% by mass or less from the viewpoint of bond strength. These upper and lower limit values can be optionally combined. For example, the upper and lower limit values may be more than 5% by mass and less than 20% by mass, may be 7% by mass or more and 19% by mass or less, may be 9% by mass or more and 18% by mass or less, or may be 12% by mass or more and 17% by mass or less.

The content of the acid-modified polyolefin in the adhesive layer 4 used in the mode <2> is preferably 5% by mass or more, more preferably 7% by mass or more, still more preferably 9% by mass or more, and particularly preferably 12% by mass or more from the viewpoint of bond strength. The upper limit of the content is not limited, but is preferably 40% by mass or less, more preferably 35% by mass or less, still more preferably 30% by mass or less, and particularly preferably 25% by mass or less from the viewpoint of bond strength. These upper and lower limit values can be optionally combined. For example, the upper and lower limit values may be 5% by mass or more and 40% by mass or less, may be 7% by mass or more and 35% by mass or less, may be 9% by mass or more and 30% by mass or less, or may be 12% by mass or more and 25% by mass or less.

The content of the acid-modified polyolefin in the adhesive layer 4 used in the mode <3> is preferably less than 20% by mass, more preferably 19% by mass or less, still more preferably 18% by mass or less, and particularly preferably 17% by mass or less from the viewpoint of bond strength. The lower limit of the content is not limited, but may be more than 0% by mass, may be 1% by mass or more, may be 2% by mass or more, or may be 3% by mass or more. These upper and lower limit values can be optionally combined. For example, the upper and lower limit values may be more than 0% by mass and less than 20% by mass, may be 1% by mass or more and 19% by mass or less, may be 2% by mass or more and 18% by mass or less, or may be 3% by mass or more and 17% by mass or less.

As described above, the adhesive can contain, for example, a base resin, a tackifier, and a plasticizer. The acid-modified polyolefin described above is contained as part of the base resin. The components of the base resin, the tackifier, and the plasticizer are not limited. For example, a non-acid-modified polyolefin can be used as the base resin. The non-acid-modified polyolefin is a resin obtained by removing acid-modified polyolefin from polyolefin. For non-acid-modified polyolefin, descriptions regarding poly-olefin in the description of the region $S_1$ can be applied.

Of the examples, the non-acid-modified polyolefin is preferably a copolymerized polyolefin using two or more different types of α-olefin monomers. The monomer is preferably at least one of ethylene, propylene, 1-butene, and 1-octene. More specifically, for example, a ternary copolymer using three types of monomers of ethylene, propylene, and 1-butene, a binary copolymer using two types of monomers of ethylene and propylene, a binary copolymer using two types of monomers of ethylene and 1-butene, and a binary copolymer using two types of monomers of propylene and 1-butene are preferable.

Furthermore, the non-acid-modified polyolefin preferably contains two or more types of non-acid-modified polyolefins having different melting points, and particularly preferably contains two types of non-acid-modified polyolefins that are a non-acid-modified polyolefin (A) and a non-acid-modified polyolefin (B) having a lower melting point than that of the non-acid-modified polyolefin (A). In this case, the melting point of the non-acid-modified polyolefin (A) is preferably 100° C. or higher, and the melting point of the non-acid-modified polyolefin (B) is preferably lower than 100° C. The difference in melting point between the two resins is not limited, but is preferably 10° C. or higher, more preferably 20° C. or higher, and still more preferably 40° C. or higher. The upper limit of the difference in melting point is not limited, but is preferably 90° C. or lower, more preferably 80° C. or lower, and still more preferably 70° C. or lower from the viewpoint of bond strength. These upper and lower limit values can be optionally combined. For example, the upper and lower limit values may be 10° C. or higher and 90° C. or lower, may be 20° C. or higher and 80° C. or lower, or may be 40° C. or higher and 70° C. or lower.

The melting point of the non-acid-modified polyolefin is the peak temperature of the melting peak when differential scanning calorimetry is performed.

Examples of the tackifier include a petroleum resin, a hydrogenated petroleum resin, a rosin resin, a rosin ester resin, a hydrogenated rosin resin, a terpene resin, a terpene phenol resin, an aromatic modified terpene resin, a hydro-genated terpene resin, a coumarone-indene resin, an alkylphenol resin, and a xylene resin. Only a single type may be used or two or more types may be used.

Furthermore, examples of wax include animal wax, plant wax, carnauba wax, candelilla wax, wood wax, beeswax, mineral wax, petroleum wax, paraffin wax, microcrystalline wax, petrolatum, higher fatty acid wax, higher fatty acid ester wax, and Fischer-Tropsch wax. Only a single type may be used or two or more types may be used.

The base 2 has been described in the modes <1> to <3>:

<1> the bonding surface S includes the region $S_1$ and the region $S_2$;

<2> the bonding surface S includes only the region $S_2$; and

<3> the bonding surface S includes only the region $S_1$.

The skin 3 has been described in the modes <4> and <5>:

<4> the bonding surface T is made of a non-polar material; and

<5> the bonding surface T includes a surface of a fiber assembly. In this regard, when the bonding surface S and the bonding surface T are bonded via the adhesive layer 4, door trims 1 having the combinations of the bonding surfaces S and the bonding surfaces T above are obtained.

Mode of Base <1> and Skin <4>

Specifically, the door trim 1 includes, for example, the base 2 of <1> and the skin 3 of <4>. That is, the door trim 1 is obtained by bonding the bonding surface S including the region $S_1$ made of polyolefin and the region $S_2$ made of polyurethane with the bonding surface T made of polyolefin via the adhesive layer 4. In such a door trim 1, a solvent-based adhesive such as a chloroprene-based adhesive, or a reactive hot melt adhesive has been conventionally used, but these adhesives have problems as described above. In the door trim 1 according to the present invention, the adhesive layer 4 is made of a non-reactive hot melt adhesive. Thus, the problem of solvent release does not occur, and shortening the curing time and improving the application workability and storage stability can be achieved at the same time. This is achieved by acid-modified polyolefin contained in the non-reactive hot melt adhesive forming the adhesive layer 4. That is, when the adhesive layer 4 contains the acid-modified polyolefin, good bondability can be provided between the bonding surface S and the bonding surface T as described above.

Mode of Base <1> and Skin <5>

The door trim 1 includes, for example, the base 2 of <1> and the skin 3 of <5>. That is, the door trim 1 is obtained by bonding the bonding surface S including the region $S_1$ made of polyolefin and the region $S_2$ made of polyurethane with the bonding surface T including a surface of a fiber assembly via the adhesive layer 4. In such a door trim 1, as in the case of the base 2 of <1> and the skin 3 of <4>, since the adhesive layer 4 contains acid-modified polyolefin, good bondability can be provided between the bonding surface S and the bonding surface T as described above, and in addition, the bonding surface T can provide firm bonding using the anchoring effect on the surface of the fiber assembly. In particular, this bonding can be achieved independent of the material of the fibers constituting the fiber assembly. When the skin 3 includes a design layer, a slab urethane layer, and a fiber assembly layer that are laminated in this order as described above, the adhesive penetrating into the fiber assembly layer can advantageously provide good bondability with the slab urethane layer.

Mode of Base <2> and Skin <4>

The door trim 1 includes, for example, the base 2 of <2> and the skin 3 of <4>. That is, the door trim 1 is obtained by bonding the bonding surface S including the region $S_2$ made of polyurethane with the bonding surface T made of polyolefin via the adhesive layer 4. In such a door trim 1, as in the mode of the base <1> and the skin <4>, since the adhesive layer 4 is made of a non-reactive hot melt adhesive containing acid-modified polyolefin, the problem of solvent release does not occur, and shortening the curing time and improving the application workability and storage stability can be achieved at the same time, and good bondability can be provided between the bonding surface S and the bonding surface T.

Mode of Base <2> and Skin <5>

The door trim 1 includes, for example, the base 2 of <2> and the skin 3 of <5>. That is, the door trim 1 is obtained by bonding the bonding surface S including the region $S_2$ made of polyurethane with the bonding surface T including a surface of a fiber assembly via the adhesive layer 4. In such a door trim 1, as in the mode of the base <1> and the skin <5>, since the adhesive layer 4 contains acid-modified polyolefin, good bondability can be provided between the bonding surface S and the bonding surface T, and in addition, the bonding surface T can provide firm bonding using the anchoring effect on the surface of the fiber assembly. This bonding can be achieved independent of the material of the fibers constituting the fiber assembly. When the skin 3 includes a design layer, a slab urethane layer, and a fiber assembly layer that are laminated in this order, the adhesive penetrating into the fiber assembly layer can advantageously provide good bondability with the slab urethane layer.

Mode of Base <3> and Skin <4>

The door trim 1 includes, for example, the base 2 of <3> and the skin 3 of <4>. That is, the door trim 1 is obtained by bonding the bonding surface S including the region $S_1$ made of polyolefin with the bonding surface T made of polyolefin via the adhesive layer 4. In such a door trim 1, since the adhesive layer 4 is made of a non-reactive hot melt adhesive containing acid-modified polyolefin, the problem of solvent release does not occur, and shortening the curing time and improving the application workability and storage stability can be achieved at the same time, and good bondability can be provided between the bonding surface S and the bonding surface T. In addition, when the base 2 is made of polyolefin, which is a non-polar material, and the skin 3 is made of polyolefin (e.g., thermoplastic polyolefin), which is a non-polar material, the base 2 and the skin 3 are bonded via the adhesive layer 4 and all the layers can be formed of olefin-based materials. That is, the constituent materials can be unified, and the door trim 1 can be made of mono-material. Since the olefin-based materials have the advantage of good recyclability, the door trim 1 made of mono-material can have the good recyclability.

Mode of Base <3> and Skin <5>

The door trim 1 includes, for example, the base 2 of <3> and the skin 3 of <5>. That is, the door trim 1 is obtained by bonding the bonding surface S including the region $S_1$ made of polyolefin with the bonding surface T including a surface of a fiber assembly via the adhesive layer 4. In the door trim 1, firm bonding can be achieved using the anchoring effect on the surface of the fiber assembly. In particular, when the material of the fibers constituting the fiber assembly is polyolefin, all the layers can be formed of olefin-based materials. That is, the constituent materials can be unified, and the door trim 1 can be made of mono-material. Since the olefin-based materials have the advantage of good recyclability, the door trim 1 made of mono-material can have the good recyclability.

17

2 Method for Manufacturing Door Trim

The method for manufacturing a door trim according to the present invention is a method for manufacturing the door trim 1 including the base 2 and the skin 3 bonded to a surface of the base 2.

The bonding surface S of the base 2 to the skin 3 includes the region $S_1$ made of polyolefin and/or a region $S_2$ made of polyurethane.

The bonding surface T of the skin 3 to the base 2 is made of polyolefin.

The method includes a bonding step of bonding the bonding surface S with the bonding surface T using a non-reactive hot melt adhesive containing acid-modified polyolefin.

That is, the bonding step is a step of forming the adhesive layer 4 described in 1 above. The door trim 1, the base 2, the skin 3, the bonding surface S, the region $S_1$, the region $S_2$, the bonding surface T, and the adhesive are as described above.

The adhesive is typically applied to either or both of the bonding surface S and the bonding surface T and these bonding surfaces are brought into contact with each other, and then pressure is applied thereto as necessary, to form the adhesive layer 4. The method for applying the adhesive is not limited, and conventionally known methods can be appropriately used. The application method may be contact application or non-contact application. The contact application is a method of applying an adhesive with an applicator being in contact with an object of the application, and the non-contact application is a method of applying an adhesive with an applicator not in contact with an object of the application. Examples of the contact application include roll coater coating and slot coater coating. Examples of the non-contact application include spiral coating, omega coating, control seam coating, slot spray coating, curtain spray coating, and dot coating. Only a single type may be used or two or more types may be used.

EXAMPLES

Hereinafter, the present invention will be specifically described by way of examples.

A base made of polyolefin and a skin made of polyolefin were bonded via an adhesive having different blending amounts of acid-modified polyolefin, and the influence on the bonding strength was examined. In the same manner, a base made of polyurethane and a skin made of polyolefin were bonded via an adhesive having different blending amounts of acid-modified polyolefin, and the influence on the bonding strength was examined.

1 Bonding of Base and Skin

The following (1) to (5) were used.

(1) Base A: molded part made of polypropylene (2) Base B: molded part made of polyurethane foam (3) Skin: skin made of polyolefin elastomer (4) Non-reactive hot melt adhesive: non-reactive polyolefin hot melt adhesive manufactured by Showa Denko Materials Co., Ltd., product name "Hi-Bon ZH601-1"

(5) Acid-modified polyolefin: maleic anhydride-modified polypropylene manufactured by Mitsubishi Chemical Corporation, product name "Modic P908, acid value 12.8"

The adhesive (4) and the acid-modified polyolefin (5) above were mixed at 200° C. using a twin-screw extruder to obtain adhesives containing 5 to 40% by mass of the acid-modified polyolefin (5) with respect to the total of the (4) and (5).

Each of the obtained adhesives having a different content of the acid-modified polyolefin was charged into a roll coater applicator, and applied to the bonding surface of the skin at 180° C. so as to have an application thickness of 80 μm.

Subsequently, the skin was heated to 170° C. and placed on the bonding surface of the base A at room temperature (25° C.) (the temperature of the skin at that time was 115° C.), and then pressure was applied to bond the base A and the skin.

Figure 11:
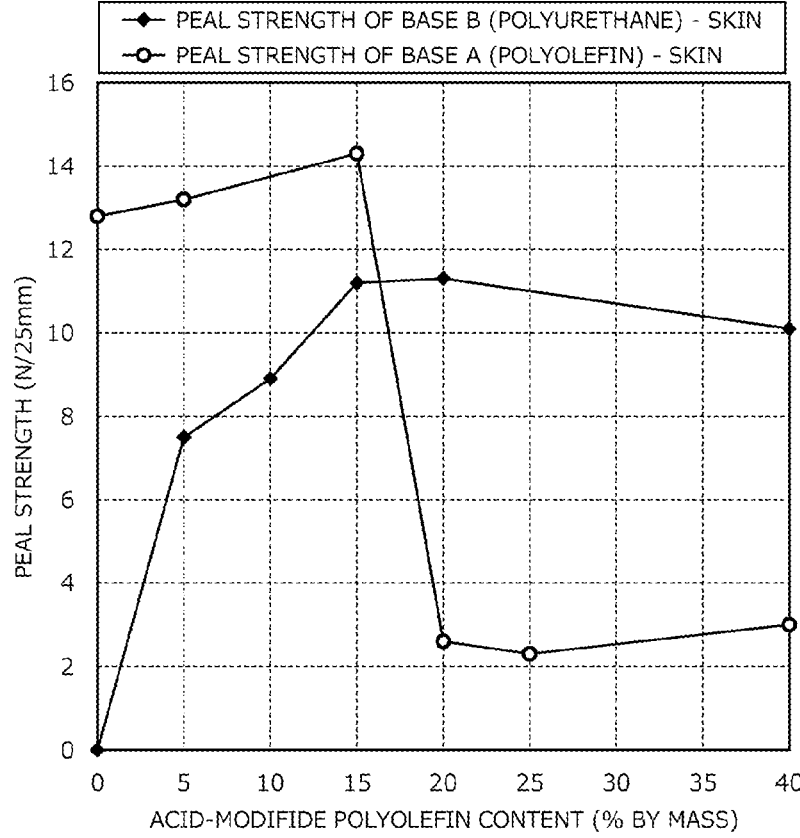
FIG. 11 is a graph showing the correlation between the peel strength and the content of acid-modified polyolefin.

For each of the obtained bonded parts (test pieces) of the base A and the skin, peel strength required to separate the skin from the base A was measured at 100° C. The results are shown in Table 1 and FIG. 11.

Each of the obtained adhesives having a different content of the acid-modified polyolefin above was charged into a roll coater applicator, and applied to the bonding surface of the skin at 180° C. so as to have an application thickness of 80 μm.

Subsequently, the skin was heated to 170° C. and placed on the bonding surface of the base B at room temperature (25° C.) (the temperature of the skin at that time was 115° C.), and then pressure was applied to bond the base B and the skin.

For each of the obtained bonded parts (test pieces) of the base B and the skin, peel strength required to separate the skin from the base B was measured at 80° C. The results are shown in Table 1 and FIG. 11.

TABLE 1

| | Experimental example Base A (polyolefin) - skin | | | | | |
| --- | --- | --- | --- | --- | --- | --- |
| | 1 | 2 | 3 | 4 | 5 | 6 |
| Acid-modified polyolefin content (% by mass) | 0 | 5 | 1.5 | 20 | 25 | 40 |
| Peal strength at 100° C. (N/25 mm) | 12.8 | 13.2 | 14.3 | 2.6 | 2.3 | 3.0 |

| | Experimental example Base B (polyurethane) - skin | | | | | |
| --- | --- | --- | --- | --- | --- | --- |
| | 7 | 8 | 9 | 10 | 11 | 12 |
| Acid-modified polyolefin content (% by mass) | 0 | 5 | 10 | 15 | 20 | 40 |
| Peal strength at 100° C. (N/25 mm) | 0 | 7.5 | 8.9 | 11.2 | 11.3 | 10.1 |

The above-mentioned examples are for illustrative purposes only and are not to be construed as limiting the invention. While the invention has been described by way of examples of typical embodiments, it is understood that the language used in the description and illustration of the present invention is to be regarded as explanatory and illustrative and not restrictive. Modifications within the scope of the appended claims are possible without departing from the scope or spirit of the invention in its form as detailed herein. Although reference has been made herein to specific structures, materials and examples in the detailed description of the present invention, it is not intended to limit the invention to the disclosure set forth herein, but rather, to cover all functionally equivalent structures, methods, and uses within the scope of appended claims.

The door trim and the method for manufacturing the door trim according to the present invention can be used in various technical fields. Specifically, the present invention is suitably used as a door trim for various vehicles (vehicles such as motor vehicles and railed vehicles, aircrafts, and ships) and a method for manufacturing such a door trim.

What is claimed is:

1. A door trim comprising:

a base; and a skin bonded to a surface of the base, wherein the base has a bonding surface S to the skin, the bonding surface S including a region $S_1$ having no polar group and a region $S_2$ having a polar group, the region $S_1$ is formed using a polyolefin molded part or a fiber molded part formed by binding a plurality of reinforcing fibers with polyolefin serving as a binder resin, the region $S_2$ is formed using a polyurethane foam layer adhered to the region $S_1$, the skin has a bonding surface T to the base, the bonding surface T is formed using a foam layer made of a polyolefin elastomer or a fiber assembly selected from one or more of a nonwoven fabric layer, a woven fabric layer, and a knitted fabric layer, the bonding surface T and the bonding surface S are bonded via a nonreactive hot melt adhesive layer, and the non-reactive hot melt adhesive layer contains acid-modified polyolefin.

2. The door trim according to claim 1, wherein the acid-modified polyolefin is maleic anhydride-modified polypropylene.

3. The door trim according to claim 2, wherein the maleic anhydride-modified polypropylene is more than 5% by mass and less than 20% by mass when a total mass of the non-reactive hot melt adhesive layer is 100% by mass.

4. The door trim according to claim 2, wherein the maleic anhydride-modified polypropylene has an acid value of 5 or more and 20 or less.

5. The door trim according to claim 2, wherein the maleic anhydride-modified polypropylene has a melt flow rate of 20 g/10 min or more at 180° C.

6. The door trim according to claim 1, wherein the non-reactive hot melt adhesive layer contains, as a base resin, the acid-modified polyolefin and a non-acid-modified polyolefin.

7. The door trim according to claim 6, wherein the acid-modified polyolefin is maleic anhydride-modified polypropylene.

8. The door trim according to claim 7, wherein the maleic anhydride-modified polypropylene is less than 20% by mass when a total mass of the non-reactive hot melt adhesive layer is 100% by mass.

9. The door trim according to claim 7, wherein the maleic anhydride-modified polypropylene has an acid value of 5 or more and 20 or less.

10. The door trim according to claim 7, wherein the maleic anhydride-modified polypropylene has a melt flow rate of 20 g/10 min or more at 180° C.

11. A method for manufacturing a door trim, the method comprising:

providing a base and a skin bonded to a surface of the base, the base having a bonding surface S to the skin, the bonding surface S including a region $S_1$ having no polar group and a region $S_2$ having a polar group, the skin having a bonding surface T to the base;

forming the region $S_1$ using a polyolefin molded part or a fiber molded part formed by binding a plurality of reinforcing fibers with polyolefin serving as a binder resin, forming the region $S_2$ using a polyurethane foam layer adhered to the region $S_1$, forming the bonding surface T using a foam layer made of a polyolefin elastomer or a fiber assembly selected from one or more of a nonwoven fabric layer, a woven fabric layer, and a knitted fabric layer, and bonding the bonding surface T with the bonding surface S using a non-reactive hot melt adhesive containing acid-modified polyolefin.

* * * * *